US009154617B2

(12) United States Patent
Jaiswal et al.

(10) Patent No.: US 9,154,617 B2
(45) Date of Patent: Oct. 6, 2015

(54) RECORDING AND PLAYING BACK PORTIONS OF A TELEPHONE CALL

(71) Applicant: INTERNATIONAL BUSINESS MACHINES CORPORATION, Armonk, NY (US)

(72) Inventors: Peeyush Jaiswal, Boca Raton, FL (US); Kiran Mutukuru, Delrey Beach, FL (US); Gregory Toon, Woodbury, CT (US); Aleksas J. Vitenas, Tinton Falls, NJ (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/866,216

(22) Filed: Apr. 19, 2013

(65) Prior Publication Data

US 2014/0315520 A1    Oct. 23, 2014

(51) Int. Cl.
*H04M 3/42* (2006.01)

(52) U.S. Cl.
CPC .... *H04M 3/42221* (2013.01); *H04M 2203/301* (2013.01); *H04M 2203/305* (2013.01)

(58) Field of Classification Search
CPC ....... H04M 1/64; H04M 1/65; H04M 3/5307; H04M 3/42221
USPC ............... 379/88.23, 88.02, 88.14, 88.04, 68; 455/412.1, 412.2; 704/231, 233
See application file for complete search history.

(56) References Cited

U.S. PATENT DOCUMENTS

| 4,841,574 A | 6/1989 | Pham et al. |
|---|---|---|
| 7,634,254 B2 | 12/2009 | Xie |
| 7,809,388 B1 | 10/2010 | Othmer |
| 7,860,722 B1 * | 12/2010 | Chow .............................. 705/1.1 |
| 7,991,128 B2 | 8/2011 | Abernethy, Jr. et al. |
| 8,139,721 B2 | 3/2012 | O'Connell et al. |
| 8,185,143 B1 | 5/2012 | Othmer |
| 2007/0211876 A1 * | 9/2007 | Othmer et al. ........... 379/201.01 |
| 2010/0034363 A1 * | 2/2010 | O'Connell et al. ......... 379/88.23 |
| 2011/0216896 A1 * | 9/2011 | Martin et al. ............. 379/265.06 |
| 2013/0089189 A1 * | 4/2013 | Mikan et al. ................ 379/88.14 |
| 2014/0050307 A1 * | 2/2014 | Yuzefovich ..................... 379/68 |

* cited by examiner

*Primary Examiner* — Kashif Siddiqui
*Assistant Examiner* — Farideh Madani
(74) *Attorney, Agent, or Firm* — Matthew Chung; Roberts Mlotkowski Safran & Cole, P.C.

(57) ABSTRACT

Approaches for recording and playing back a portion of a telephone call are provided. An approach includes establishing a subscriber of a recording and play back service. The approach includes recording, by a computing device, a portion of a conversation of the subscriber that occurs in a call between a first telephone and a second telephone. The approach additionally includes storing, by the computing device, the portion of the conversation when the call ends. The approach further includes analyzing, by the computing device, the stored portion of the conversation to detect predefined keywords. The approach also includes automatically providing the subscriber with an option to play back the stored portion of the conversation when at least one of the predefined keywords is detected during the analyzing.

19 Claims, 6 Drawing Sheets

US 9,154,617 B2

RECORDING AND PLAYING BACK PORTIONS OF A TELEPHONE CALL

FIELD OF THE INVENTION

The present invention generally relates to telephone communication and, more particularly, to a method and system for recording and playing back portions of a telephone call.

BACKGROUND

Many telephone calls are interrupted for a variety of reasons. For example, wireless calls are frequently interrupted when a wireless telephones drops the call, e.g., ceases having sufficient signal to maintain the network connection by, for example, moving out of range of a wireless base station. As another example, wireless calls are often interrupted when a wireless telephone runs out of battery charge during the call. Moreover, any type of call may be interrupted when one of the parties must unexpectedly hang up in order to attend to something urgent.

After a call is interrupted for any reason, the two parties to the call normally call back and resume the conversation. However, it is often the case the one or both of the parties does not remember the topic of conversation that was occurring when the call was interrupted. This uncertainty may be compounded by the fact that one or both of the parties may not know at what point in the conversation the call was interrupted. For example, in the case of a dropped call, one or both of the parties may continue to speak before realizing that the call has been interrupted.

SUMMARY

In a first aspect of the invention, there is a method that includes establishing a subscriber of a recording and play back service. The method also includes recording, by a computing device, a portion of a conversation of the subscriber that occurs in a call between a first telephone and a second telephone. The method additionally includes storing, by the computing device, the portion of the conversation when the call ends. The method further includes analyzing, by the computing device, the stored portion of the conversation to detect predefined keywords. The method also includes automatically providing the subscriber with an option to play back the stored portion of the conversation when at least one of the predefined keywords is detected during the analyzing.

In another aspect of the invention, there is a computer program product including a computer usable storage device having readable program code embodied in the storage device. The computer program product includes at least one component operable to receive at least one of a duration and keywords from a first user. The at least one component is operable to record in real time a conversation between the first user and a second user, the conversation occurring in a call between a first telephone of the first user and a second telephone of the second user. The at least one component is operable to store a portion of the conversation when the call ends, wherein the stored portion of the conversation has the duration. The at least one component is operable to analyze the stored portion of the conversation to detect a presence of at least one the keywords contained within the stored portion of the conversation. The at least one component is operable to automatically transmit a message to the first telephone indicating an option to play back the stored portion of the conversation when at least one the keywords is detected during the analyzing.

In a further aspect of the invention, there is a system including a CPU, a computer readable memory and a computer readable storage media. The system includes program instructions to record and store a portion of a conversation that occurs during a call between a first telephone and a second telephone, wherein the stored portion of the conversation has a predefined duration that is less than an entire duration of the call. The system also includes program instructions to detect a presence of at least one predefined keyword contained within the stored portion of the conversation. The system additionally includes program instructions to automatically transmit a message to the first telephone based on the detecting. The system further includes program instructions to provide the stored portion of the conversation to the first telephone as one of text and/or audio. The system also includes program instructions to obtain consent of a second user associated with the second telephone prior to performing the recording or the providing. The program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
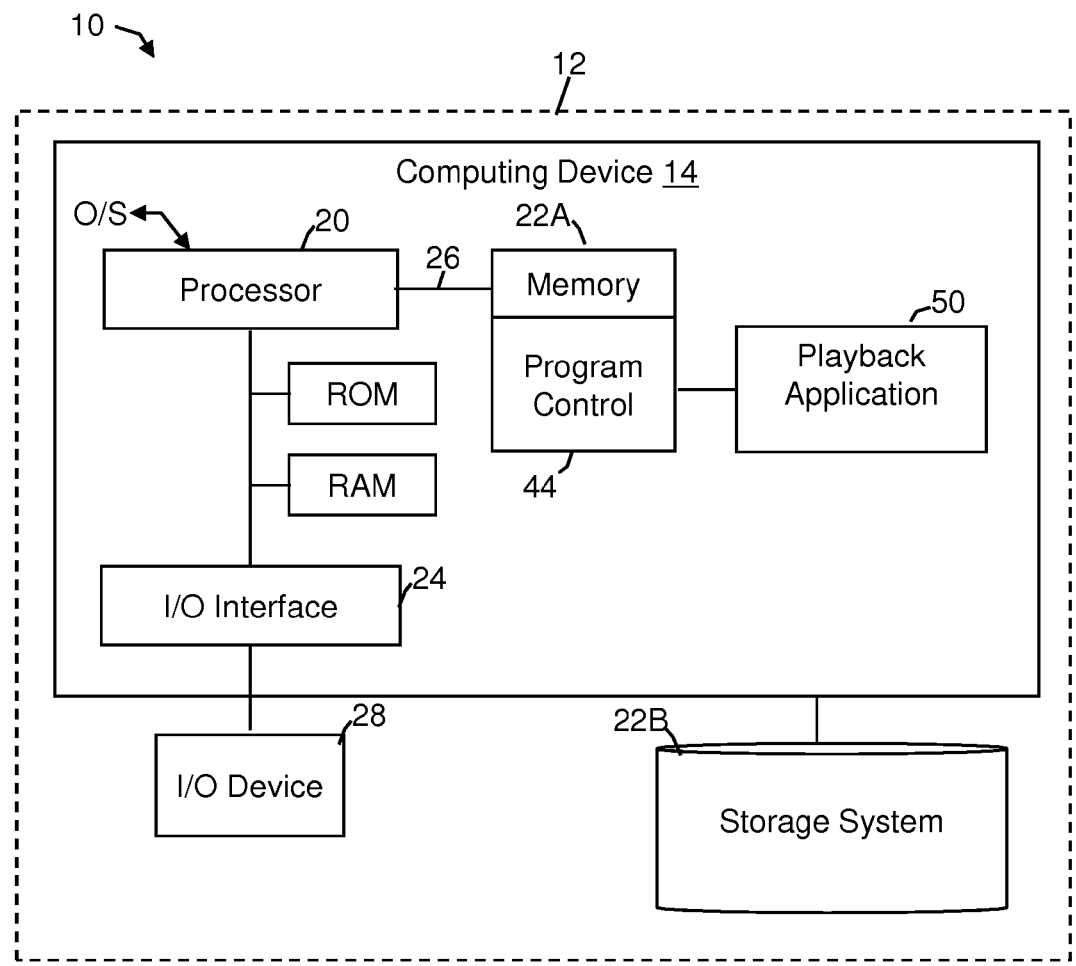
FIG. 1 shows an illustrative environment for implementing the steps in accordance with aspects of the invention.

The present invention generally relates to telephone communication and, more particularly, to a method and system for recording and playing back portions of a telephone call. According to aspects of the invention, a most recent portion of a telephone conversation is recorded and buffered in real time during the conversation and saved when the call ends. In embodiments, upon a system detecting pre-defined keywords in the conversation, one or more of the participants of the call may be automatically presented with an option to play back the recorded portion of the conversation. In further embodiments, one or more of the participants of the call may manually request play back of the recorded portion of the conversation from their device or from another user's device. Aspects of the invention optionally limit play back to situations in which all parties to the call consent to the recording. In this manner, implementations of the invention may be used to record and play back a portion of a telephone conversation in order to refresh the participant's memory of the conversation before resuming the conversation.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server or other computing system 12 that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a playback application 50 that is configured to control and/or perform one or more of the processes described herein. The playback application 50 can be implemented as one or more program code in program control 44 stored in memory 22A as separate or combined modules. Additionally, playback application 50 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

According to aspects of the invention, playback application 50 is configured to record in real time and buffer the most recent portion of a phone conversation and store the recorded portion (e.g., in storage system 22B) upon termination of the call. In embodiments, the most recent portion of the conversation is defined as the last "n" seconds of the call before the call ended, and is less than an entire duration of the call. The number of seconds "n" may be defined by a user or a service provider. In one exemplary implementation, n=20 such that playback application 50 records and buffers the most recent 20 seconds of the conversation in real time and saves a recording of the last 20 seconds of the conversation when the call ends. The invention is not limited to n=20, however, and any suitable duration may be used within the scope of the invention.

In embodiments, playback application 50 is configured to analyze the stored portion of the conversation (e.g., the saved last "n" second of the conversation) to detect whether it contains any pre-defined keywords. As used herein, keywords refer to words and/or phrases that are pre-defined by a user and/or a service provider, and that are indicative of an interrupted call. For example, keywords may include, but are not limited to: "are you there", "hello", repeated utterances of "hello", "cannot hear your", "call me back", "call you back", "I'll call you back", "can I call you back", "you're breaking up", etc.

In accordance with aspects of the invention, the keywords may be pre-defined by a user and/or a service provider and stored as text, e.g., in storage system 22B. The playback application 50 may utilize speech recognition (e.g., automatic speech recognition, speech to text, etc.) techniques to translate the spoken words of the recorded portion of the conversation to text, and then compare the text to the stored keywords. In embodiments, upon detecting at least one of the keywords in the stored portion of the conversation, playback application 50 automatically presents one or more of the participants of the call with the option to play back the stored portion of the conversation. The playback application 50 may present the play back to the participant(s) as an audio recording and/or a text transcription. The playback application 50 may reside at the user telephone device or at a service provider server, as described in greater detail with respect to FIGS. 2 and 3 below.

Still referring to FIG. 1, computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
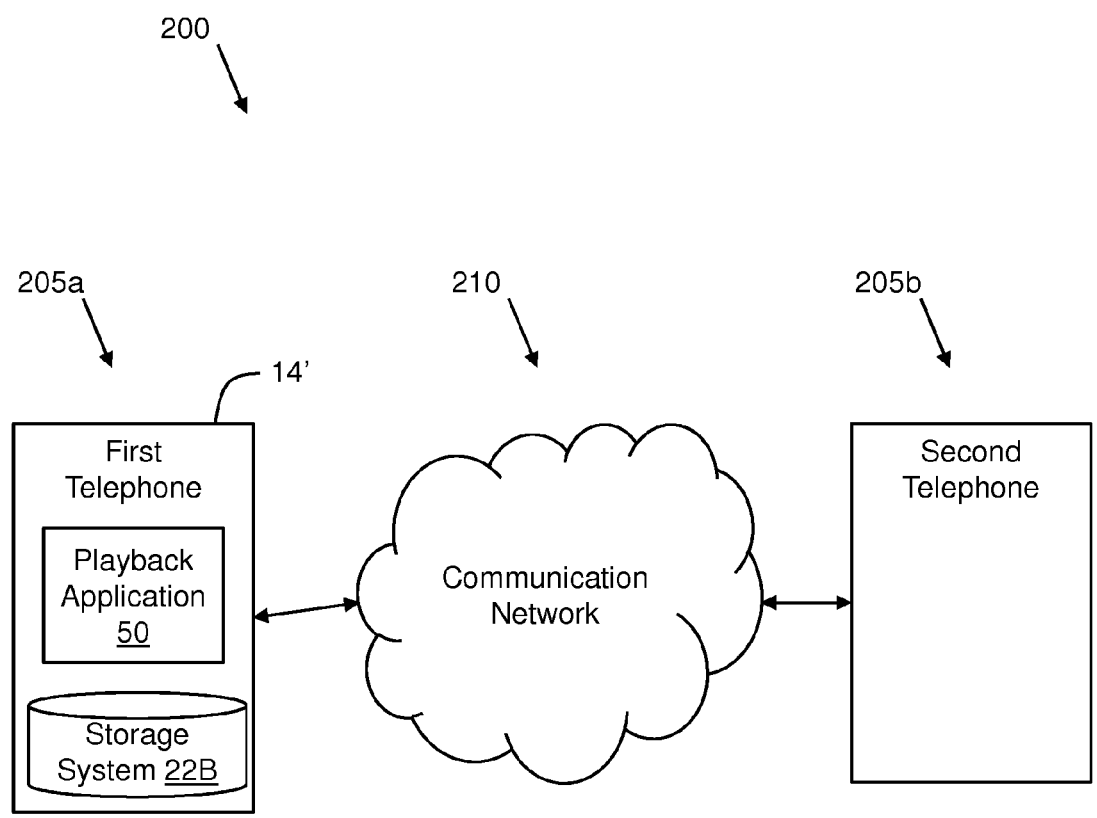
FIGS. 2 and 3 show functional block diagrams of systems and methods in accordance with aspects of the invention.

FIG. 2 shows a block diagram of a system 200 in accordance with aspects of the invention. System 200 includes a first telephone 205a and a second telephone 205b that communicate with one another via a network 210. In embodiments, network 210 is any suitable communications network that operatively connects first telephone 205a and second telephone 205b for the purpose of making telephone calls. For example, network 210 may be a public switched telephone network (PSTN), the Internet, or the like.

In the implementation depicted in FIG. 2, first telephone 205a includes computing device 14' programmed with playback application 50 as described with respect to FIG. 1. For example, first telephone 205a may include a smartphone or similar device that includes a mobile operating system, wireless communication antenna, processor, touch screen interface, memory, etc. In this manner, the functions of playback application 50 are executed at first telephone 205a, and the recorded portion of the conversation is stored locally at first telephone 205a. The second telephone 205b may be any type of telephone.

In aspects of the invention, and with continued reference to FIG. 2, playback application 50 records and buffers the most recent "n" seconds of a conversation during a telephone call between first telephone 205a and second telephone 205b. When the call ends, playback application 50 stores the last "n" seconds of the conversation (e.g., at storage system 22B included in first telephone 205a) and compares the stored portion of the conversation against a list of pre-defined keywords.

In the event playback application 50 detects one or more of the keywords in the stored portion of the conversation, playback application 50 then automatically presents the user of first telephone 205a with an option to play back the stored portion of the conversation. For example, playback application 50 may display a message on the display of first telephone 205a, the message indicating that play back is available. The message may include an input item (such as a button or link) that, when acted on by the user, initiates play back of the stored portion of the conversation. The play back may take the form of an audio play back (e.g., via a speaker of first telephone 205a) and/or a textual play back (e.g., a text transcription of the stored portion of the conversation displayed via text message, email, specialized viewing area on the phone display, etc.).

Figure 3:
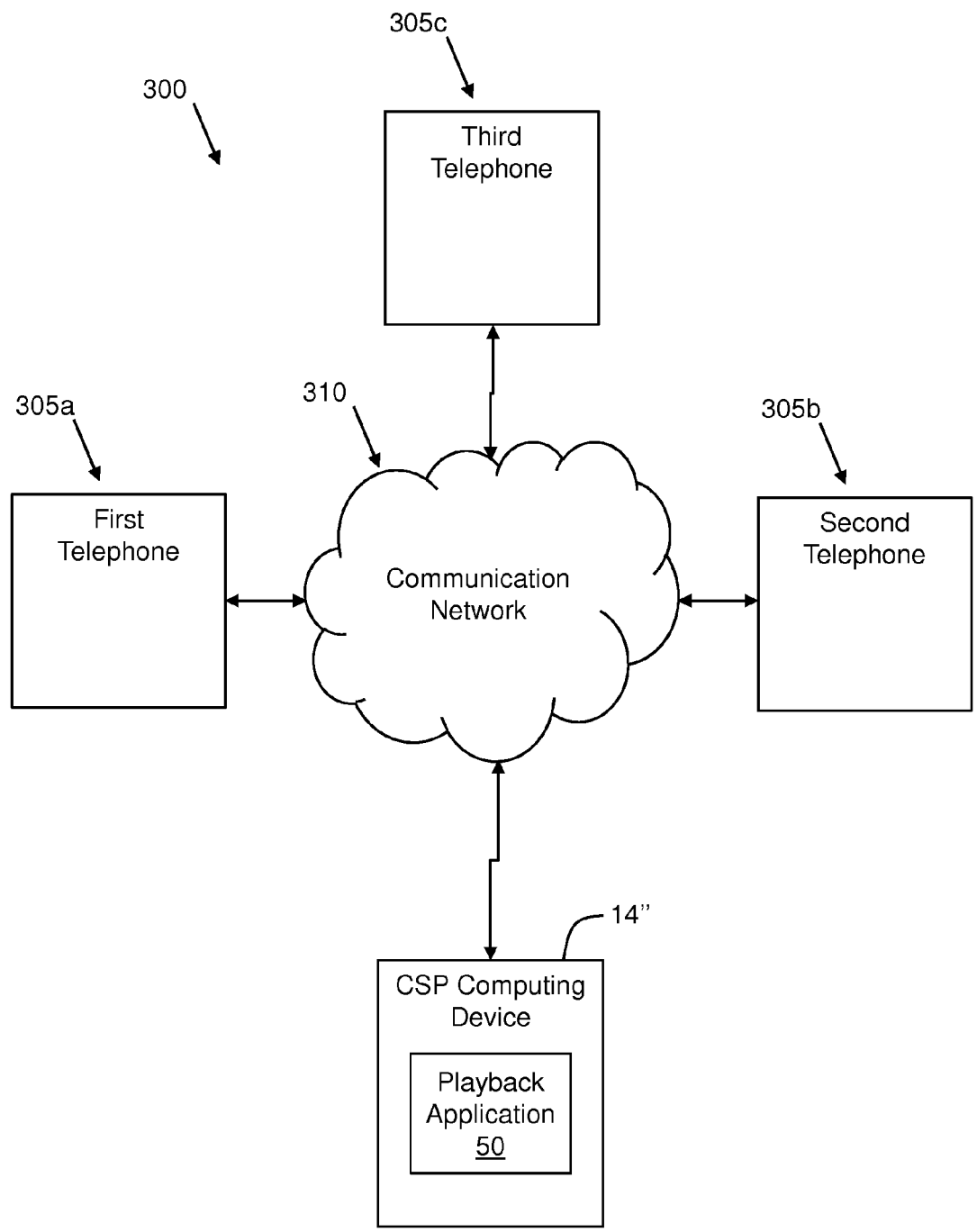

FIG. 3 shows a block diagram of a system 300 in accordance with aspects of the invention. System 300 includes a first telephone 305a and a second telephone 305b that communicate with one another via a network 310. In embodiments, network 310 is any suitable communications network that operatively connects first telephone 305a and second telephone 305b for the purpose of making telephone calls. For example, network 310 may be a public switched telephone network (PSTN), the Internet, or the like. First telephone 305a and second telephone 305b may be any suitable telephone devices, including but not limited to smartphones as described herein.

In the implementation depicted in FIG. 3, playback application 50 resides on a computing device 14" that is physically separate from first telephone 305a and second telephone 305b. For example, computing device 14" may be connected to or included in a node of network 310, such as a server that is operated by a communications service provider (CSP). In this manner, storage of the recorded portion of the conversation and keyword detecting functions of playback application 50 are performed remotely from first telephone 305a and second telephone 305b, i.e., at CSP computing device 14". In this implementation, playback application 50 transmits data to first telephone 305a and/or second telephone 305b to indicate when one or more keywords has been detected and provide the user(s) the option of playing back the recorded portion of the conversation.

By storing the recorded portion of the conversation at a third party location, e.g., at CSP computing device 14" as in FIG. 3, a user may access play back of the stored portion of a conversation from a device other than their telephone. For example, a user of first telephone 305a may use third telephone 305c to access the stored portion of a conversation that occurred during a call between first telephone 305a and second telephone 305b, e.g., when first telephone 305a runs out of battery during the conversation. In this example, the user may utilize third telephone 305c to log in to the user's account with the CSP via a mobile application, website, or the like of the CSP. Once logged into their account, the user may request and receive play back of the stored portion of the conversation. When the user is logged into their account via third telephone 305c, the CSP may provide the user with personalized information via third telephone 305c, including a list of the user's most recent calls (e.g., dialed, missed, received, etc.), a view of the user's stored contacts (e.g., names, telephone numbers, email addresses, etc.), and any other information the user may normally receive from the CSP at their device (e.g., first telephone 305a). In this manner, the user may utilize another device (e.g., third telephone 305c) to play back the recording and redial second telephone 305b to resume the conversation.

In aspects of the invention, when a user is logged into their CSP account via a different device (e.g., via third telephone 305c as in the example above), the CSP may ensure that any pay-per-use services are charged to the user's account and not to the different device (e.g., via third telephone 305c). For example, charges for roaming, data usage, etc. may be charged to the user's account when the user is logged in via another person's device. Similarly, the CSP may monitor social and other data accessed while a user is logged in to their account via another person's device (e.g., via third telephone 305c as in the example above) in order to provide personalized services to the user.

In embodiments, and in both system 200 of FIG. 2 and system 300 of FIG. 3, a user may accept or decline play back that is automatically provided by playback application 50. For example, a user may accept or decline the option to play back the stored portion by speaking a predefined voice command into their telephone, inputting a specific key combination (e.g., *88) at their telephone, pressing an "accept" or "decline" button (or the like) that is presented on a touch screen display of their telephone, etc.

In embodiments, and in both system 200 of FIG. 2 and system 300 of FIG. 3, a user may manually initiate play back of the stored portion of the conversation of the most recent call even in situations when playback application 50 does not detect a keyword in the stored portion of the conversation. For example, a user may manually initiate play back by speaking a predefined voice command into their telephone, inputting a specific key combination (e.g., *84) at their telephone, pressing a "play back" button (or the like) that is presented on a touch screen display of their telephone, etc. Upon receiving such input, playback application 50 provides the stored portion of the conversation to the user's phone in one or more of the manners already described herein, e.g., playing the recording over the phone speaker, transmitting (e.g., emailing, etc.) an audio file (e.g., *.wav, *.mp3, etc.) of the recording to the phone, transmitting a text transcription of the recording to the phone, etc.

In aspects of the invention, a user may play back the stored portion of the conversation any desired number of times (e.g., one or more times). In additional aspects of the invention, a user may play back the stored portion of the conversation before re-dialing the other user. Alternatively, a user may play back the stored portion of the conversation after re-dialing the other user so that both users may listen to the play back together.

In embodiments, recording the conversation may be conditioned upon obtaining consent of all parties of the conversation. For example, playback application 50 may be configured to determine that all parties in a telephone conversation consent to having the conversation recorded before recording the conversation. The playback application 50 may determine consent by determining whether the parties are subscribers to a recording and playback feature provided by their CSP. The playback application 50 may ask non-subscribers for consent prior to recording a portion of a conversation.

In additional aspects of the invention, playback application 50 may be configured to record and save a portion of the conversation based on parameters in addition to, or other than, the last "n" seconds of the conversation. For example, playback application 50 may be configured to record and save every $m^{th}$ word of the conversation (e.g., every $3^{rd}$ word, or any other desired number). As another example, playback application 50 may be configured to record and save predefined words, such as at least one of geographic locations, dates, numbers, etc., in which a database of such pre-defined words is pre-configured and stored for comparison to words spoken during the conversation. Such a database may be populated by the CSP and/or the user.

Flow Diagrams

Figure 4:
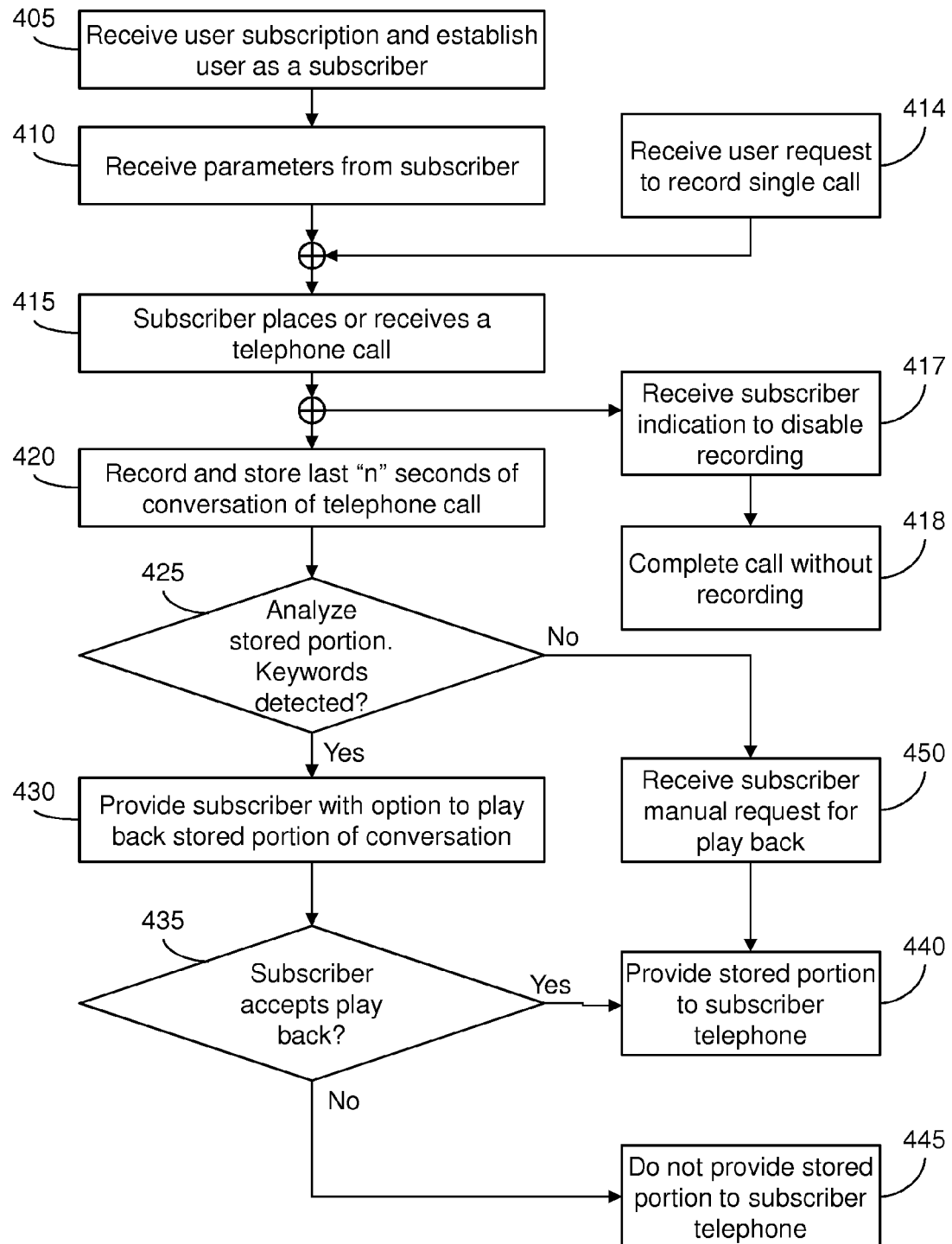
FIGS. 4-6 show exemplary flows in accordance with aspects of the invention.
Figure 5:
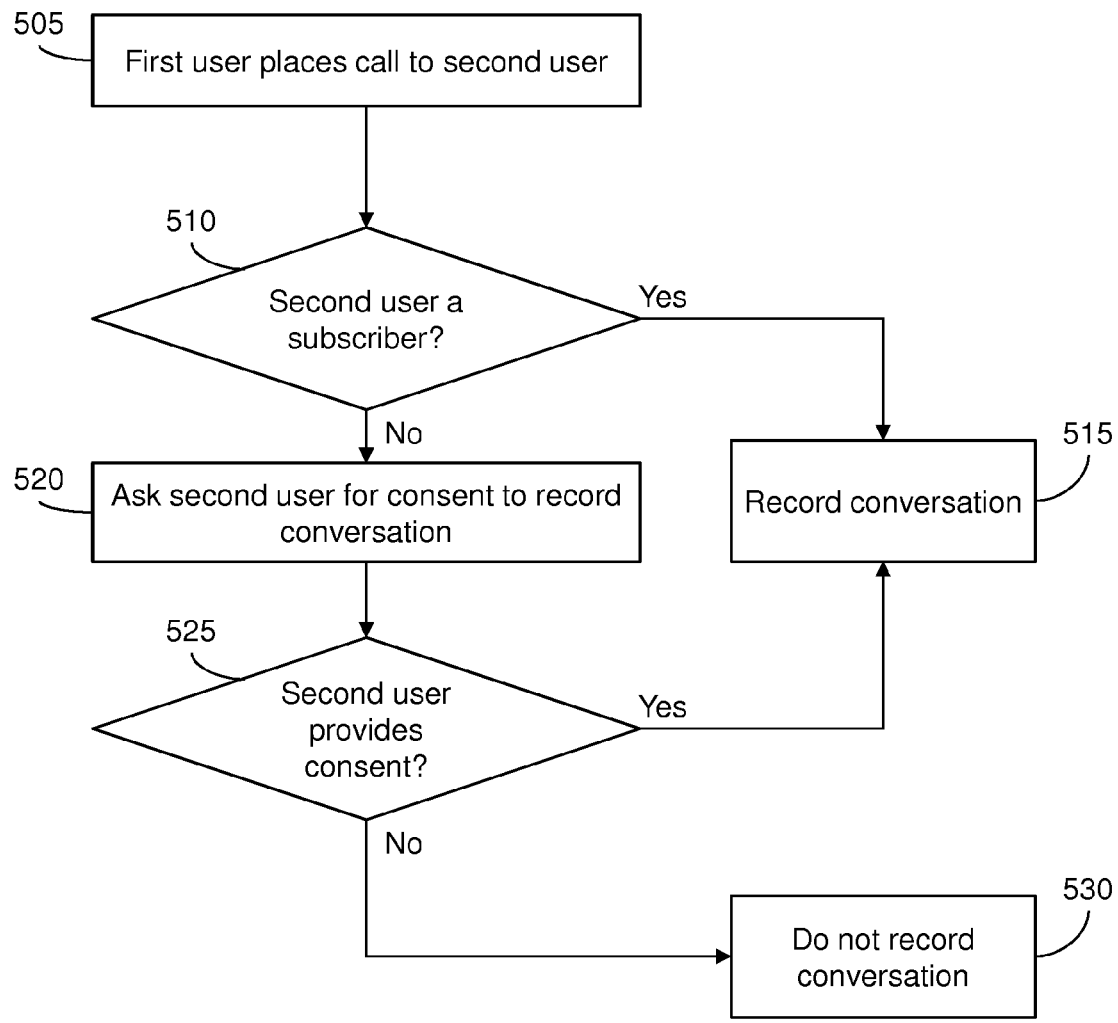
Figure 6:
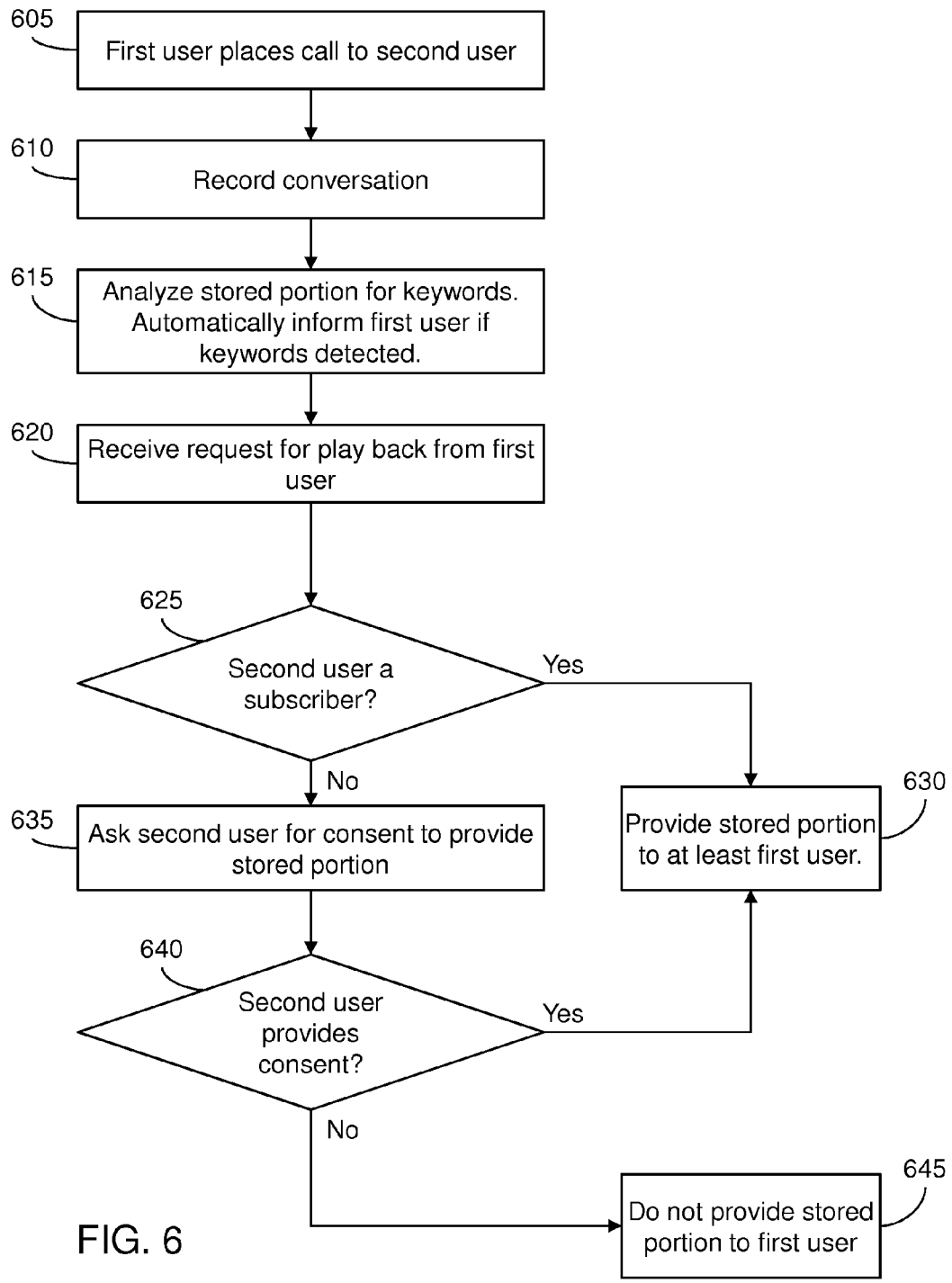

FIGS. 4-6 show exemplary flows for performing aspects of the present invention. The steps of FIGS. 4-6 may be implemented in the environments of any one or more of FIGS. 1-3, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow for a process in accordance with aspects of the present invention. At step 405, a user of a telephone (e.g., first telephone 205a, or first telephone 305a, etc.) is established as a subscriber to a recording and play back service with a service provider (e.g., CSP). For example, the user may elect to subscribe to the playback service as part of their calling plan with the CSP. The user may subscribe to the service in a conventional manner, such as through a website of the CSP, through a mobile application of the CSP, or by speaking with a human representative of the CSP by telephone or in person. Step 405 may include a playback application (e.g., playback application 50 running on computing device 14) receiving information (e.g., from the user, an employee of the CSP, etc.) establishing the user's subscription with the recording and play back service. After signing up for the service, the user may be referred to as a subscriber.

At step 410, the subscriber (e.g., the user from step 405) sets one or more parameters of the recording and play back service. For example, the subscriber may use their telephone or another computing device to define parameters such as: the number of seconds "n" of each conversation that is that is recorded and saved; keywords that are compared against the portion of the conversation that is that is recorded and saved; pre-defined words to record and save (e.g., geographic locations, dates, numbers, etc.). In embodiments, the subscriber performs step 410 using the telephone, e.g., using at least one of voice commands, keyed inputs to a telephone keypad, touch-screen inputs to a mobile application, inputs to a website, etc. Step 410 may include the playback application receiving the parameters from the user (e.g., via the user's telephone or other computing device).

In accordance with further aspects of the invention, steps 405 and 410 are optional and a user may elect to utilize the recording and play back service on a call-by-call basis. For example, a CSP may provide its customers with the option to request recording of a call individually on a call-by-call basis, for example, by the user speaking a predefined voice command into their telephone, inputting a specific key combination (e.g., *98) at their telephone, pressing a "record" button (or the like) that is presented on a touch screen display of their telephone, etc., at the initiation of the call. In this case, a user may initiate recording at the outset of the call as depicted at step 414, and the process then proceeds as described herein from step 415 using CSP pre-defined parameters (e.g., n=20 seconds, etc.).

At step 415, the subscriber places a call from their telephone to a second telephone (e.g., second telephone 205b, or second telephone 305b, etc.), e.g., in a conventional manner. Step 415 may alternatively include the subscriber receiving a call at their telephone from the second telephone, also in a conventional manner.

As depicted at step 417, aspects of the invention permit a subscriber to disable the recording and play back service on a call-by-call basis. For example, at the outset of the call of step 415, the subscriber may disable the recording and play back service for this particular call by speaking a predefined voice command into their telephone, inputting a specific key combination (e.g., *99) at their telephone, pressing a "disable" button (or the like) that is presented on a touch screen display of their telephone, etc. The call then proceeds at step 418 without being recorded.

In the event the subscriber does not disable the recording and play back service for the call of step 415, then at step 420 the playback application (e.g., playback application 50 running on computing device 14) records the conversation of the call and maintains a buffer of the last "n" seconds of the call. Still at step 420, when the call ends, the playback application stores the last "n" second of the conversation (e.g., in storage 22B). Step 420 may be performed, for example, in a manner similar to that described with respect to any one of FIGS. 1-3, with the playback application and storage being local to the subscriber's telephone (e.g., as in FIG. 2) or remote from the subscriber's telephone (e.g., as in FIG. 3).

At step 425, playback application analyzes the stored portion of the conversation from step 420 to detect whether any keywords are included in the recorded portion. This may be performed in the manner described above with respect to FIGS. 1-3, e.g., by translating the stored portion to text and comparing the text to stored keywords.

In the event a keyword is detected at step 425, then at 430 the playback application automatically provides the subscriber with the option to play back the stored portion of the conversation. This may be performed in the manner described above with respect to FIGS. 1-3, e.g., by causing a message to be presented at the subscriber's telephone, which message gives the subscriber the opportunity to provide an input to accept or decline play back. The message may take any suitable form, such as a visual message displayed at the subscriber's telephone and including button-based and/or key-based options to accept or decline play back. Alternatively, the message may take the form of an audio message played at the subscriber telephone and including voice-based and/or key-based options to accept or decline play back.

At step 435, the subscriber accepts or declines play back of the stored portion of the conversation in response to the message that was automatically provided at step 430. Step 435 may include the playback application receiving the subscriber's input to accept or decline play back. When the subscriber accepts play back at step 435, then at step 440 the playback application provides the stored portion of the conversation to the subscriber's telephone, e.g., in a manner similar to that described with respect to FIGS. 1-3. For example, the playback application may cause the subscriber's telephone to play the audio of the stored portion of the conversation. As another example, the playback application may transmit an email containing an audio file of the stored portion of the conversation to the subscriber's telephone. As another example, the playback application may transmit a text transcription of the stored portion of the conversation to the subscriber's telephone, e.g., via email, text message, etc. On the other hand, when the subscriber declines play back at step 435, the playback application does not provide the stored portion of the conversation to the subscriber's telephone, e.g., as indicated at step 445.

Referring back to step 425, in the event the playback application does not detect a keyword in the recorded portion of the conversation, then the subscriber has the option of manually initiating play back. For example, at step 450 the subscriber may manually request play back by speaking a predefined voice command into their telephone, inputting a specific key combination (e.g., *84) at their telephone, pressing a "play back" button (or the like) that is presented on a touch screen display of their telephone, etc. When the playback application receives a manual initiation of playback from the subscriber at step 450, the playback application provides the stored portion of the conversation to the subscriber's telephone in the manner described with respect to step 440.

In accordance with aspects of the invention, step 450 may be performed by the subscriber using their telephone (e.g., the telephone that was used in the call of step 415) to manually request the play back. Additionally or alternatively, step 450 may be performed by the subscriber using another telephone (e.g., a telephone that was not used in the call of step 415) to manually request the play back, e.g., in a manner similar to that described with respect to FIG. 3.

FIG. 5 depicts an exemplary flow for a process for determining consent at the outset of a call in accordance with aspects of the present invention. At step 505 a first user places a call from their telephone (e.g., first telephone 205a, first telephone 305a, etc.) to a second telephone (e.g., second telephone 205a, second telephone 305a, etc.) of a second user. In this example, the first user is a subscriber to the recording and play back service (e.g., as in step 405) or has requested recording and play back for this one call (e.g., as in step 455), and thus has provided explicit consent for their conversation to be recorded (e.g., via terms of subscription agreement between the first user and the CSP).

At step 510, the playback application (e.g., playback application 50 running on computing device 14) determines whether the second user is also a subscriber to the recording and play back service. In embodiments, the playback application compares the telephone number or other identifying information of the second user to CSP records of subscribers and determines whether or not the second user subscribes to the service.

In the event the second user is a subscriber to the recording and play back service and thus has provided explicit consent for their conversations to be recorded (e.g., via terms of subscription agreement between the second user and the CSP), then at step 515 the playback application records the conversation (e.g., in a manner described with respect to step 420). Upon termination of the call after step 515, the process may proceed in a manner similar to that described with respect step 425 and subsequent steps as described with respect to FIG. 4. In aspects of the invention where both parties to the call are subscribers, the playback application provides both parties (e.g., the first user and the second user) the opportunity to play back the recorded portion of the conversation, e.g., in the manner described herein.

In the event the second user is not a subscriber to the recording and play back service, then at step 520 the playback application transmits a message to the second user at the second telephone asking for consent to record the conversation. The message may take any suitable form, such as an audible message transmitted to and played at the second telephone, a visual message transmitted to and displayed at the second telephone, etc. The message may include a mechanism for the second user to respond, e.g., via voice command, keypad input, touch screen input, etc., to provide consent or refuse consent.

At step 525, the playback application receives the second user's response from step 520, either providing or refusing consent. In the event the second user provides consent for the conversation to be recorded, then the process proceeds to step 515 as already described. On the other hand, in the event the second user refuses consent, then the call proceeds at step 530 without being recorded.

FIG. 6 depicts an exemplary flow for a process for determining consent after call has been interrupted in accordance with aspects of the present invention. At step 605 a first user places a call from their telephone (e.g., first telephone 205a, first telephone 305a, etc.) to a second telephone (e.g., second telephone 205a, second telephone 305a, etc.) of a second user. In this example, the first user is a subscriber to the recording and play back service (e.g., as in step 405) or has requested recording and play back for this one call (e.g., as in step 455), and thus has provided explicit consent for their conversations to be recorded (e.g., via terms of subscription agreement between the first user and the CSP).

At step 610, the playback application (e.g., playback application 50 running on computing device 14) records the conversation, e.g., in a manner similar to that described with respect to step 420. Consent of at least one party to a call is sometimes required for a call to be recorded, and such requirements are satisfied in this example since the first user has provided explicit consent for their conversations to be recorded (e.g., via terms of subscription agreement between the first user and the CSP).

At step 615, the playback application analyzes the stored portion of the conversation from step 610 to detect whether any keywords are included in the recorded portion. Step 615 may be performed in a manner similar to step 425. Step 615 may also include informing the first user when keywords are detected, e.g., in a manner similar to step 430.

At step 620, the playback application receives a request for play back from the first telephone after either automatic notification provided to the first user (e.g., in a manner similar to step 430) or manual request from the first user (e.g., in a manner similar to step 450).

At step 625, the playback application determines whether the second user is also a subscriber to the recording and play back service. Step 625 may be performed in a manner similar to step 510.

In the event the second user is a subscriber to the recording and play back service, then at step 630 the playback application provides the stored portion of the conversation to the first telephone as requested by the first user. Step 630 may also include the playback application providing the stored portion of the conversation to the second telephone. The providing at step 630 may be performed in a manner similar to step 440.

In the event the second user is not a subscriber to the service, then at step 635 the playback application transmits a message to the second user at the second telephone asking for consent to play back the already-recorded and stored portion of the conversation. The message may take any suitable form, such as an audible message transmitted to and played at the second telephone, a visual message transmitted to and displayed at the second telephone, etc. The message may include a mechanism for the second user to respond, e.g., via voice command, keypad input, touch screen input, etc., to provide consent or refuse consent.

At step 640, the playback application receives the second user's response from step 635, either providing or refusing consent. In the event the second user provides consent for the stored portion of the conversation to be played back, then the process proceeds to step 630 as already described. On the other hand, in the event the second user refuses consent, then at step 645 the playback application does not provide the stored portion of the conversation to either the first telephone or the second telephone. Step 645 may include the playback application sending a message to one or both the first telephone and the second telephone that consent has been denied and that the stored portion of the conversation is not available for play back.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    establishing a subscriber of a recording and play back service;
    recording, by a computing device, a portion of a conversation of the subscriber that occurs in a call between a first telephone and a second telephone;
    storing, by the computing device, the portion of the conversation when the call ends;
    analyzing, by the computing device, the stored portion of the conversation to detect predefined keywords;
    automatically providing the subscriber with an option to play back the stored portion of the conversation when at least one of the predefined keywords is detected during the analyzing; and
    receiving, by the computing device, the predefined keywords generated by the subscriber prior to occurrence of the call;
    wherein, the subscriber is a user who places or receives the call using one of the first telephone and the second telephone;
    the recording comprises buffering in real time a most recent "n" seconds of the stored portion of the conversation, wherein the most recent "n" seconds is a predefined duration that is less than an entire duration of the call;
    the automatically providing the subscriber with the option to play back the stored portion of the conversation comprises causing the first telephone to display an accept button and a decline button; and
    the method further comprises playing audio of the stored portion of the conversation after the subscriber has re-dialed the second telephone such that both the subscriber and a second user listen to the played audio together.

2. The method of claim 1, wherein the storing the portion of the conversation comprises storing the last "n" seconds of the conversation.

3. The method of claim 2, further comprising receiving a value of "n" from the subscriber.

4. The method of claim 1, further comprising providing the stored portion of the conversation to the first telephone as audio.

5. The method of claim 1, further comprising providing the stored portion of the conversation to the first telephone as text.

6. The method of claim 1, further comprising receiving a manual request from the subscriber to play back the stored portion of the conversation.

7. The method of claim 6, wherein the manual request is received from a third telephone.

8. The method of claim 1, wherein the first telephone includes the computing device such that the storing and analyzing are performed locally at the first telephone.

9. The method of claim 1, wherein the computing device is separate from the first telephone such that the storing and analyzing are performed remotely from the first telephone.

10. The method of claim 1, further comprising obtaining consent of a user associated with the second telephone prior to performing the recording.

11. The method of claim 1, further comprising obtaining consent of a user associated with the second telephone prior to providing the stored portion of the conversation to the first telephone.

12. The method of claim 1, wherein a service provider at least one of creates, maintains, deploys and supports the computing device.

13. The method of claim 1, wherein steps of claim 1 are provided by a service provider on a subscription, advertising, and/or fee basis.

14. The method of claim 1, further comprising deploying a system for recording and playing back portions of telephone calls, the deploying comprising providing the computing device operable to perform the steps of claim 1.

15. A computer program product comprising a computer readable hardware storage device having readable program code stored on the computer readable hardware storage device, the program code comprising:
    program code to receive at least one of a duration and keywords from a first user;
    program code to record in real time a conversation between the first user and a second user, the conversation occurring in a call between a first telephone of the first user and a second telephone of the second user;
    program code to store a portion of the conversation when the call ends, wherein the stored portion of the conversation has the duration;
    program code to analyze the stored portion of the conversation to detect a presence of at least one the keywords contained within the stored portion of the conversation; and
    program code to automatically transmit a message to the first telephone indicating an option to play back the stored portion of the conversation when at least one the keywords is detected during the analyzing,
    wherein the user who places or receives the call, receives the message,
    the recording in real time comprises buffering in real time a most recent "n" seconds of the stored portion of the conversation, wherein the most recent "n" seconds is a predefined duration that is less than an entire duration of the call;
    the automatically transmitting the message to the first telephone indicating an option to play back the stored portion of the conversation comprises causing the first telephone to display an accept button and a decline button on a touch screen interface; and further comprising program code to play audio of the stored portion of the conversation after the first user has re-dialed the second telephone such that both the first user and the second user listen to the played audio together.

16. The computer program product of claim 15, wherein the at least one component is operable to play back the stored portion of the conversation at the first telephone as at least one of audio and text.

17. The computer program product of claim 15, wherein the at least one component is operable to obtain consent of the second user prior to performing the recording or prior to providing the stored portion of the conversation to the first telephone.

18. The computer program product of claim 15, wherein the at least one component is operable to receive a log in of the first user from a computing device different than the first telephone and provide the stored portion of the conversation to the computing device as at least one of audio and text.

19. A system, comprising:
one or more computer processors;
a computer readable hardware storage device; and
program instructions stored on the computer hardware storage device for execution by the one or more computer processors, the program instructions comprising:
program instructions to record and store a portion of a conversation that occurs during a call between a first telephone and a second telephone, wherein the stored portion of the conversation has a predefined duration that is less than an entire duration of the call;
program instructions to detect a presence of at least one predefined keyword contained within the stored portion of the conversation;
program instructions to automatically transmit a message to the first telephone which places or receives the call, based on the detecting;
program instructions to provide the stored portion of the conversation to the first telephone as one of text and/or audio; and
program instructions to obtain consent of a second user associated with the second telephone prior to performing the recording or the providing,
wherein the recording comprises buffering in real time a most recent "n" seconds of the stored portion of the conversation, wherein the most recent "n" seconds is the predefined duration that is less than an entire duration of the call;
the first telephone comprises a smartphone that includes a mobile operating system, wireless communication antenna, processor, touch screen interface, and memory; and
further comprising program instructions to automatically provide a subscriber with the option to play back the stored portion of the conversation comprises causing the smartphone to display an accept button and a decline button on the touch screen interface; and
further comprising program instructions to play audio of the stored portion of the conversation after the subscriber has re-dialed the second telephone such that both the subscriber and the second user listen to the played audio together.

\* \* \* \* \*